July 5, 1960

R. W. KRAMER 2,943,691

DISK HARROW AND CONTROL MEANS

Filed Nov. 7, 1957

INVENTOR.
Richard W. Kramer
BY Paul O. Pippel
Atty.

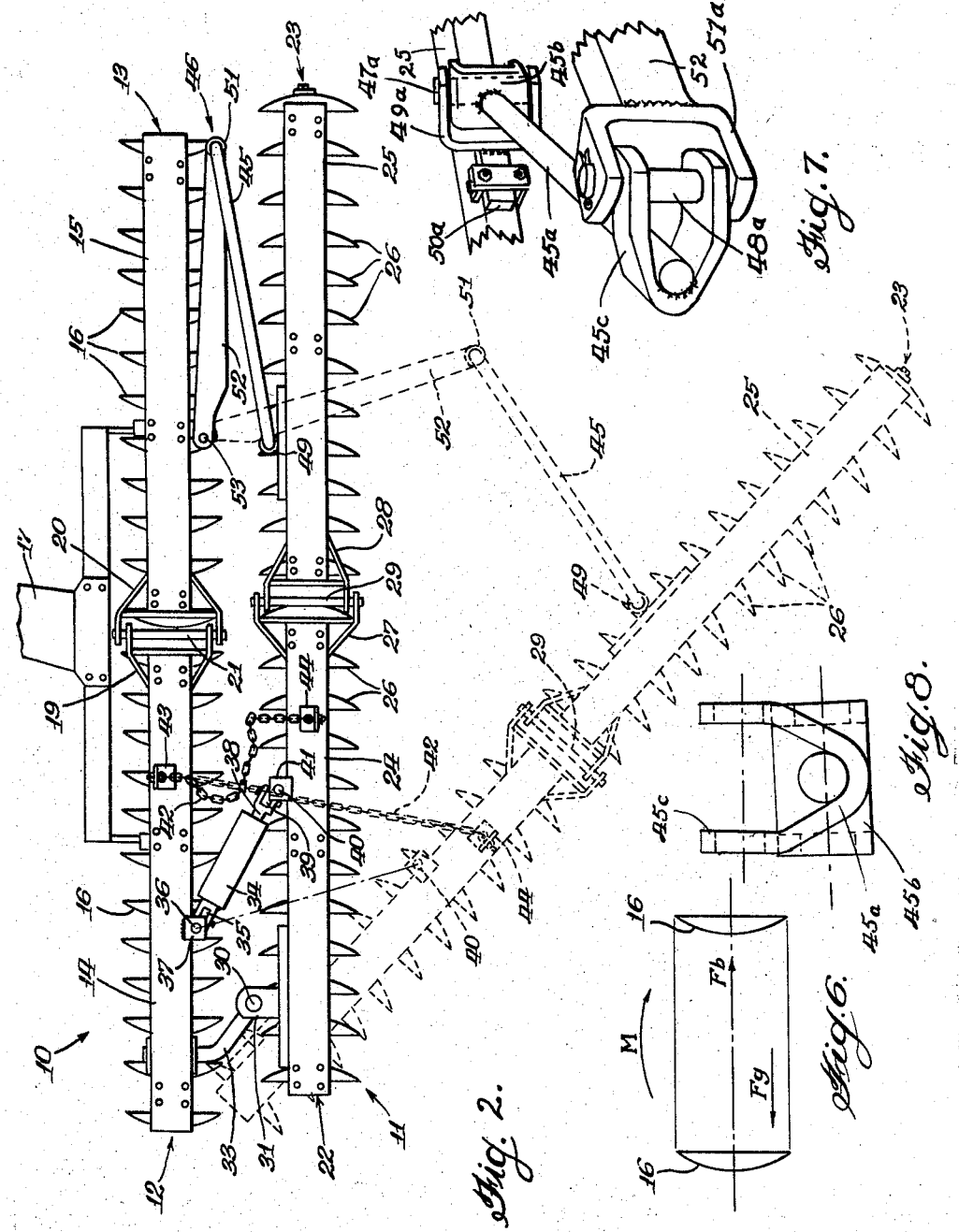

United States Patent Office 2,943,691
Patented July 5, 1960

2,943,691

DISK HARROW AND CONTROL MEANS

Richard W. Kramer, Modesto, Calif., assignor to International Harvester Company, Chicago, Ill., a corporation of New Jersey Filed Nov. 7, 1957, Ser. No. 695,101

9 Claims. (Cl. 172—572)

This invention relates to agricultural implements and particularly to disk harrows. More specifically the invention concerns a disk harrow of the offset type.

A conventional trail-behind offset disk harrow consists of front and rear gangs connected at one end on a vertical axis for horizontal swinging between parallel, or transport, and angled or operating positions. The disks of one gang have their concave sides facing in the opposite direction from the disks of the other gang, and in operation torque forces acting on the disk gangs must be resisted by the connections therebetween.

For example, in a right-hand offset harrow the concavity of the disks of the front gang faces to the right and that of the rear gang faces to the left, and the concave end of each gang tends to dig deeper than the opposite end thereof. Thus, twisting forces are set up between the gangs of a harrow wherein the front gang of a right-hand offset disk harrow is subjected to forces which tend to rotate it to the right about a longitudinal axis, while the rear gang tends to rotate to the left about a longitudinal axis. These forces increase with the increase in working angle between the gangs.

In relatively small implements of this type it is necessary only to provide hinge connections therebetween of sufficient strength to withstand these forces. However, in larger harrows, particularly where each gang consists of a pair of hinged sections cutting a wide swath in the ground, it is necessary to provide additional means to overcome the tendency of the gangs to rotate in opposite directions about longitudinal axes by the application of balancing torque forces, and these torque forces must be made to increase with the increase in working angle between the gangs, so as to insure that the implement will operate at a uniform depth at all times.

The present invention has for its object the provision of a disk harrow having novel means for balancing the torque forces acting on the gangs.

Another object of the invention is the provision of novel means for balancing the torque forces acting upon a harrow of the type referred to, wherein the resistance to said forces automatically increases with the increase therein.

Another object of the invention is the provision of articulated linkage connecting the outer ends of the gangs of an offset disk harrow including a horizontal bar member generally perpendicular to said gangs in the operating position thereof and generally parallel thereto in transport, wherein the means connecting said bar between said linkage and the frame of one of the gangs comprises means serving as bearings having parallel vertical axes on said linkage and said gang frame, and means serving as a pair of generally parallel vertically extending spindles carried by the bar for reception in the respective of said bearings, said spindles being angularly displaced when received in said bearings.

Other objects and advantages of the invention will become clear from the following detailed description when read in conjunction with the accompanying drawings wherein:

Figure 1 is a view in perspective of an offset disk harrow embodying the features of this invention in operating position and drawn behind a tractor;

Figure 2 is a plan view of the harrow of this invention showing the parallel relationship of the front and rear disk gangs when the implement is being transported, and indicating in dotted lines the angling of the rear gang relative to the front gang when they are shifted to their operating position, and also illustrating the jack-knifed articulated links connecting the outer portions of the gang generally parallel to the axes of the gang and their approach toward a perpendicular relationship to the gangs as they move into the dotted line or operating position;

Figure 6 is a diagrammatic illustration of the forces acting upon the front gang of the harrow shown in the drawings when in operation;

Figure 7 is an enlarged detail in perspective of a modified form of torsion bar of this invention; and Figure 8 is an end elevation of the torsion bar of Figure 7 without the spindles.

Figure 1:
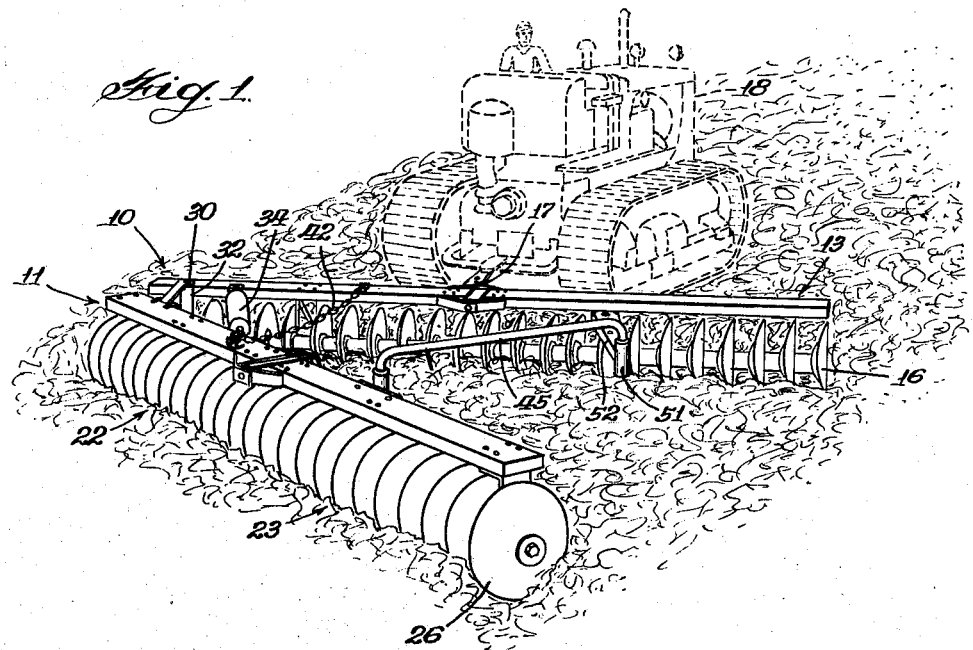
Figure 4:
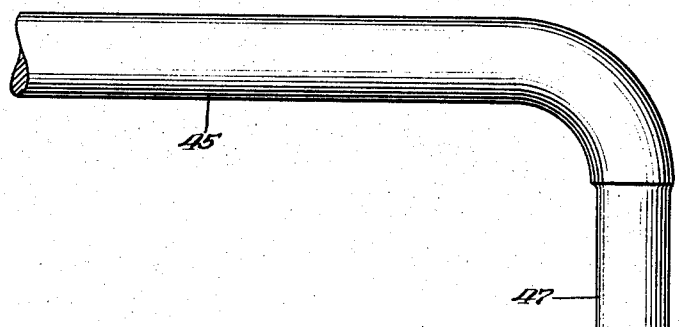
Figure 4 is a detail on a larger scale of one end of one of the links showing the downwardly bent spindle portion thereof.

In the drawings, the numerals 10 and 11 designate, respectively, the front and rear gangs of the offset disk harrow with which this invention is concerned. Front gang 10 includes transversely extending aligned gang sections 12 and 13 comprising aligned supporting frame members 14 and 15, each of which supports a plurality of disks 16. The disk gangs 10 and 11 are of conventional construction and are provided with a hitch structure 17 connected to the frame members 14 and 15, for attachment to a tractive vehicle in the form of a tractor 18.

Gang sections 12 and 13 are flexibly connected due to the substantial width of the implement, to permit it to follow ground contour, by the provision at their inner ends of clevises 19 and 20 mounted upon a horizontal longitudinally extending pivot pin 21.

Rear disk gang 11 is constructed similarly to front gang 10 and includes a pair of aligned gang sections 22 and 23 comprising frame members 24 and 25 carrying a plurality of disks 26. As clearly shown in the drawings, the concave sides of the front gang disks 16 face forwardly on the right diagonal, while the concave sides of the disks 26 of the rear gang face forwardly on the left diagonal.

The rear gang 11 is flexibly constructed in the same manner as front gang 10 and clevises 27 and 28 secured to the inner ends of frame members 24 and 25, respectively, are mounted upon a horizontal longitudinally extending pivot pin 29.

The implement illustrated in the drawings is a right-hand offset disk harrow which means that, facing in the direction of travel, the disk gangs are hinged at the left and open to the right for operation. For a left-hand harrow the connecting parts are merely reversed. The disk gangs 10 and 11 are hingedly connected for relative angling between parallel, or transport, and relatively angled, or operating position, by the provision of a vertical hinge pin 30 carried by a bracket 31 secured to the rear gang frame member 24. A vertical sleeve member 32 mounted on the hinge pin 30, has secured thereto a pivot member 33 pivotally mounted on the forward frame member 14.

Angling and deangling of the disk gangs and control of the transport and operating positions thereof is accomplished by power operated means comprising a hydraulic cylinder 34 pivotally anchored to a member 35 secured to a pivot pin 36 mounted in a bracket 37 affixed to the forward gang frame 14. A piston rod 38 slidable in cylinder 34 is pivotally mounted upon another member 39 secured to a pivot pin 40 carried by a bracket 41 affixed to the rear frame member 24. In the transport position of Figure 2 the cylinder and piston rod unit 34, 38, is shown in retracted position. Fluid under pressure is supplied to the cylinder 34 by any suitable means from the tractor 18, and extension of the cylinder and piston unit to the selected extent angles the gangs 10 and 11 about the vertical hinge 30 to the selected operating position. Adjustable limiting means designed to limit the angle between the gangs is provided by a flexible chain 42 anchored to a bracket 43 affixed to the forward frame 14 and to a bracket 44 affixed to the rear frame 24.

In a right-hand offset disk harrow the concave sides of the disks face diagonally to the right in the front gang and in the rear gang the concave faces of the disks face diagonally in the opposite direction to the left. The pressure of the soil against the concave side of the disks causes the foremost disks of the front gang to tend to penetrate deeper. This sets up forces in the front gang which may be expressed as tilting the left-hand end of the front gang upwardly to revolve the gang laterally about a horizontal longitudinal axis. Forces acting in the opposite direction on the rear gang force the left-hand forward end thereof downwardly and the right-hand end upwardly, tending to rotate the gang laterally to the left about a horizontal longitudinally extending axis. In order for the implement to perform satisfactorily and penetrate to an even depth throughout the cutting width, it is necessary to maintain the implement parts in equilibrium by offsetting and balancing the above-mentioned forces.

These forces are represented diagrammatically in Figure 6, regarded as a rear elevation of the front gang 10. It will be noted that Fg is the ground force acting against the concave face of the disks, Fb is a force balancing the ground resistance and is opposite in direction to the force Fg. Since Fg is applied to the blades below the ground level, and Fb above the ground surface, it will be observed that a moment M is applied tending to rotate the gang as a whole about a generally longitudinal axis. Thus, unless a balancing moment is applied by some external means, the gang will dig deeper at its concave end than at its convex end. As pointed out before, the rear gang will also tend to dig deeper at its concave end.

In order to balance these forces and cause the disks of the two gangs to penetrate uniformly, applicant has provided a torsion bar or arch beam 45 forming part of an articulated linkage designated at 46 extending between the outer sections 15 and 25 of the disk gangs 10 and 11. The ends of beam 45 are bent vertically downwardly at right angles to the main body of the bar and are reduced in diameter to provide elongated spindles 47 and 48. Bar 45 extends horizontally, and its rear spindle 47 is rotatably receivable in a vertical bearing 49 affixed to a bracket 50 secured to the right-hand rear frame member 25. Bearing 49 is parallel to another bearing 51 affixed to the rear end of another link in the form of a beam 52, the forward end of which is pivotally connected at 53 to the right-hand frame member 15 of the front gang 10, the bearing 51 serving to pivotally receive the spindle 48 at the forward end of torsion bar 45.

The greater the working angle between the front and rear disk gangs, the greater are the forces designated in diagrammatic Figure 6 for the front gang, it being understood that the forces operating against the rear disk gang are in the opposite direction and the reverse of the forces indicated in Figure 6. Therefore, since these forces increase as the magnitude of the working angle between the gangs increases, it is essential that the forces utilized to balance them also increase. Where balancing means have previously been employed for harrows of this type, it has been necessary to make individual adjustments for each selected working angle. Applicant, however, has provided means whereby the applied balancing forces increase automatically as the working angle between the gangs is increased.

Figure 5:
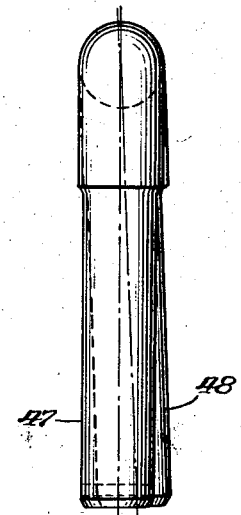
Figure 5 is an end elevation of the link shown in Figure 4 illustrating the angularly displaced relationship of the spindles at each end thereof.
Figure 3:
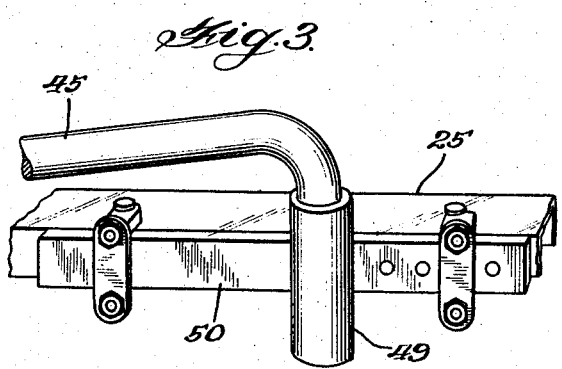
Figure 3 is an enlarged detail in perspective of a portion of the linkage connecting the outer parts of the disk gang and illustrating the pivotal connection of one of the links to the rear gang.

To accomplish the foregoing, one of the spindles of torsion bar 45, such as spindle 48, is made non-parallel with respect to spindle 47 by pre-twisting the torsion bar so that spindle 48 is angularly displaced relative to spindle 47. Thus, when the spindles 47 and 48 are inserted in the parallel vertical bearings 49 and 51, respectively the weight of the implement parts tends to bias the spindles toward a parallel relation the same as the paralleled relation between the bearings 49 and 51. Since the tendency of the spindles 47 and 48 is to return to the non-parallel position shown in Figure 5, a force is exerted thereby not only to urge the left-hand end of the front disk gang 10 downwardly, but also to urge the right-hand end of rear disk gang 11 downwardly, thus offsetting the tendency of the right-hand end of the front gang and the left-hand end of the rear gang to dig deeper than the other. The balancing forces exerted by the torsion bar 45 is at a minimum when the latter is generally parallel to the disk gangs in transport position as indicated in Figure 2. However, as the torsion bar 45 approaches a perpendicular relationship with the disk gangs or parallelism with a longitudinal axis as the working angle increases, more of the torsional force developed in the bar 45 is applied directly to balancing the force tending to rotate the gang about a longitudinal axis. Conversely, as the gangs approach the parallelism of Figure 2, torsion bar 45 swings away from a longitudinal direction and less of the torsional force developed in the bar is effective in applying balancing torque to the gangs about said longitudinal axis. Thus reduction in balancing torque coincides with the reduction in magnitude of the moment M of Figure 6 due to the decrease in angle between the gangs as the harrow is brought to its transport position.

A modification of the torsion bar of this invention is shown at 45a in Figure 7, in which the non-parallel spindles 47a and 48a are carried by yokes 45b and 45c, respectively, affixed to the ends of the bar. In the operating position of bar 45a shown in Figure 7, the yokes are upright, the arms thereof being vertically spaced and each yoke having axially aligned openings to pivotally receive the spindles 47a and 48a.

Spindle 47a is pivotally received in vertically aligned openings provided in a clevis 49a affixed, as by welding, to a bar 50a clamped to beam 25, said openings forming a vertical bearing for spindle 47a. Spindle 48a is pivotally received in vertically aligned openings provided in a clevis 51a affixed, as by welding, to the end of beam 52, said openings forming a vertical bearing for spindle 48a, the axis of which is parallel to the axis of the openings in clevis 49a.

As illustrated in Figure 8, the axes of the openings in the yokes 45b and 45c are in non-parallel relation, so that in the operating position of Figure 7, spindle 48a received in the openings in yoke 45c is angularly displaced relative to spindle 47a.

It is believed that the operation of the offset disk harrow of this invention will be clearly understood from the foregoing description. It should likewise be understood, however, that the invention has been described in its preferred embodiment only, and that modifications may be made therein without departing from the spirit of the invention or the scope of the appended claims.

What is claimed is:

1. In an offset disk harrow having front and rear disk gangs pivotally connected at their inner ends for horizontal swinging from a parallel transport to a relatively angled operation position, wherein the action of the soil on the disks of said front and rear gangs imposes twisting stresses between the gangs tending to force the outer end of the front gang down and the outer end of the rear gang up, means connecting the outer ends of said gangs including a horizontal torsion bar having means serving as spindles at its ends extending at right angles thereto, one of said spindles being angularly displaced relative to the other, means serving as parallel vertical bearings carried by said gangs to rotatably receive said spindles and adapted to bias said spindles toward a parallel relation, the torsional stress thereby imposed on said bar exerting a force to oppose the said action of the soil on said gangs.

2. The invention set forth in claim 1, wherein said bar is pre-twisted to angularly displace one of said spindles relative to the other, and upon receipt of said spindles in said bearings the force exerted by the bar to oppose the action of the soil on said gangs increases with the increase in angle between said gangs.

3. The invention set forth in claim 2, wherein each said gang comprises a pair of aligned pivotally connected sections, the inner ends of the inner sections of said gangs being pivotally connected to relatively angle the outer sections of said gangs.

4. In an offset disk harrow including front and rear disk gangs, means hingedly connecting said gangs together at one end for relative horizontal swinging from a position with said gangs parallel for transport to a relatively angled or operating position, and additional means connecting the outer ends of said gangs, comprising a pair of links pivotally connected to said gangs and to each other and pivotable from a generally parallel relationship with said gangs in their transport position to operating positions approaching perpendicular thereto, one of said links comprising a horizontal torsion bar having its ends bent in a vertical plane, and parallel vertical bearings carried by the other of said links and one of said gangs adapted to pivotally receive said bent ends of said torsion bar, one of said bent ends being angularly displaced relative to the other prior to reception in said bearings imposing torsional stress upon said bar to resist ground forces tending to rotate said gangs in opposite directions about longitudinal axes.

5. In an offset disk harrow having front and rear transversely disposed disk gangs pivotally connected at their inner ends for horizontal swinging from a parallel closed position transversely of the direction of travel to a relatively angled operating position, the resistance of the soil in the operating position tending to cause the outer end of the front gang and the inner end of the rear gang to penetrate deeper than the other ends thereof whereby torque forces are imposed on the harrow tending to rotate said gangs in opposite directions about longitudinal axes, torque balancing means opposing said torque forces by exerting down pressure against the inner end of the front gang and the outer end of the rear gang, comprising a horizontal link pivotally connected at one end to said front gang by means accommodating horizontal swinging of the link, means serving as a vertical bearing at the other end of said link, another vertical bearing means secured to said rear gang parallel to said first-mentioned bearing, and a torsion bar pivotally connecting the rear gang to said link and swingable from a position generally parallel to said gangs in the closed parallel position thereof to a position approaching the perpendicular with respect to said gangs, said bar including a horizontal portion and a pivot member at each end extending in a vertical plane for pivotal reception in the respective of said bearings, and one of said pivot members being angularly displaced relative to the other prior to reception in said bearings.

6. In an offset disk harrow having front and rear transversely disposed disk gangs pivotally connected at their inner ends for horizontal swinging from a substantially parallel closed position to a relatively angled open position, the disks of said gangs being arranged with their concave sides facing laterally in opposite directions, whereby torque forces tend to turn said gangs in opposite directions about longitudinal horizontal axes, the combination of means for balancing said torque forces, comprising a horizontal bar having its ends bent in a vertical plane, means operatively connected to said forward gang forming a vertical bearing adapted to pivotally receive one of the bent ends of said horizontal bar, means operatively connected to said rear gang forming a vertical bearing parallel to said other of the bent ends of said bar, the connection of said bar to said front and rear gangs being adapted to resist said torque forces, and one of said bent ends being angularly displaced relative to the other said bent end prior to reception thereof in said bearings, whereby, upon receipt of said bent ends in the respective of said bearings, said bar is twisted about its longitudinal axis in a direction tending to force said bent ends into parallel relation.

7. In an offset disk harrow having front and rear transversely disposed disk gangs pivotally connected at their inner ends for horizontal swinging from a substantially parallel closed position to a relatively angled open position, the disks of said gangs being arranged with their concave sides facing laterally in opposite directions, whereby torque forces tend to turn said gangs in opposite directions about longitudinal horizontal axes, the combination of means for balancing said torque forces comprising generally horizontal bar means, means serving as a spindle carried at each end of said bar means and extending in a generally vertical plane, means operatively connected to one of said gangs forming means serving as a vertical bearing adapted to pivotally receive one of said spindles, means operatively connected to the other of said gangs forming means serving as a vertical bearing parallel to said other bearing, and one of said spindles being in a plane angularly displaced relative to the plane of the other said spindle prior to reception thereof in said bearings whereby, upon receipt of said spindles in said bearings, said bar is twisted about its longitudinal axis in a direction tending to force said spindles into parallel relation.

8. In an offset disk harrow having front and rear transversely disposed disk gangs pivotally connected at their inner ends for horizontal swinging from a substantially parallel closed position to a relatively angled open position, the disks of said gangs being arranged with their concave sides facing laterally in opposite directions, whereby torque forces tend to turn said gangs in opposite directions about longitudinal horizontal axes, the combination of means for balancing said torque forces, comprising generally horizontal bar means, a support affixed to each end of said bar means, a pivot member carried by each of said supports and extending generally perpendicularly thereto, one of said pivot members being angularly displaced relative to the other, and means serving as generally vertical parallel bearings carried by said front and rear gangs adapted to receive the respective of said pivot members, whereby said bar is twisted about its longitudinal axis in a direction tending to force said pivot members into parallel relation.

9. The invention set forth in claim 8, wherein each of said supports is an upright yoke having vertically spaced aligned pivot openings therein to receive one of said pivot members, the axis of the pivot openings in one of said yokes being angularly displaced relative to the other.

References Cited in the file of this patent

UNITED STATES PATENTS

| | | |
|---|---|---|
| 2,604,746 | Frank et al. | July 29, 1952 |
| 2,608,813 | Frank | Sept. 2, 1952 |
| 2,798,419 | Moriceau | July 9, 1957 |